United States Patent
Pyszczek

[11] Patent Number: 6,030,422
[45] Date of Patent: Feb. 29, 2000

[54] METHOD FOR MODIFYING THE ELECTROCHEMICAL SURFACE AREA OF A CELL USING A PERFORATED FILM

[75] Inventor: Michael F. Pyszczek, Leroy, N.Y.

[73] Assignee: Wilson Greatbatch Ltd., Clarence, N.Y.

[21] Appl. No.: 09/362,830

[22] Filed: Jul. 28, 1999

Related U.S. Application Data

[62] Division of application No. 08/963,657, Nov. 3, 1997, Pat. No. 5,965,291.

[51] Int. Cl.⁷ .................................................. H01M 2/16
[52] U.S. Cl. ............................ 29/623.1; 429/94; 429/249
[58] Field of Search ..................... 429/94, 249; 29/623.1

[56] References Cited

U.S. PATENT DOCUMENTS

| | | |
|---|---|---|
| Re. 23,644 | 4/1953 | Grant . |
| 696,489 | 4/1902 | Pumpelly . |
| 1,576,974 | 3/1926 | Huebner . |
| 2,135,492 | 11/1938 | Brennan . |
| 2,880,260 | 3/1959 | Strauss . |
| 3,762,959 | 10/1973 | McCoy ..................................... 136/141 |
| 3,811,943 | 5/1974 | Minck et al. ................................ 136/6 |
| 4,024,323 | 5/1977 | Versteegh ................................ 429/249 |
| 4,110,515 | 8/1978 | Gupta ....................................... 429/104 |
| 4,184,012 | 1/1980 | Barrella ....................................... 429/94 |
| 4,205,122 | 5/1980 | Miura et al. ............................. 429/144 |
| 4,351,889 | 9/1982 | Sundberg ................................. 429/141 |
| 4,405,696 | 9/1983 | Fischer et al. ........................... 429/104 |
| 4,743,520 | 5/1988 | Rosansky .................................... 429/94 |
| 5,342,709 | 8/1994 | Yahnke et al. ............................ 429/162 |

*Primary Examiner*—John S. Maples
*Attorney, Agent, or Firm*—Hodgson Russ Andrews Woods & Goodyear LLP

[57] ABSTRACT

A perforated fabric for modifying the effective electrochemical surface area of a cell is described. The size and pattern of perforations in the fabric determine the effective electrochemical surface area of the cell. In practice, the modified cell comprises a layer of perforated fabric placed between the anode and the cathode along with a suitable electrolyte absorbent separator material. Electrodes are then assembled into a cell using typical techniques with a spirally-wound configuration being preferred. The present perforated fabric provides for the production of cells with variable effective electrochemical surface areas while using a single manufacturing line. A preferred cell chemistry comprises a fluorinated carbon electrode present in an alkali metal system with the preferred perforated fabric comprising a Fluorpeel fabric, which is a woven fiberglass cloth impregnated with PTFE polymer.

12 Claims, 6 Drawing Sheets

FIG. 7

METHOD FOR MODIFYING THE ELECTROCHEMICAL SURFACE AREA OF A CELL USING A PERFORATED FILM

CROSS-REFERENCE TO RELATED APPLICATION

This application is a divisional application based on application Ser. No. 08/963,657, filed Nov. 3, 1997 now U.S. Pat. No. 5,965,291.

BACKGROUND OF THE INVENTION

1. Field of the Invention

The present invention generally relates to the conversion of chemical energy to electrical energy. More particularly, the present invention relates to modifying the effective electrochemical surface area of a cell using a mechanically perforated, ion-impermeable fabric disposed between the anode and the cathode. A preferred perforated fabric for a cell having a fluorinated carbon electrode is a Fluorpeel fabric, which is a woven fiberglass cloth impregnated with synthetic resinous fluorine-containing polymers. This material is able to perform its attenuating function while maintaining structural integrity in fluorinated carbon electrode chemistries, which are known to experience swelling during discharge.

2. Prior Art

It is known to use a mechanically perforated film disposed between the anode and the cathode to control the volume of electrolyte passing between the electrodes. U.S. Pat. No. 4,743,520 to Rosansky describes a self-limiting cell including a non-porous, non-electrolyte permeable separator barrier having a predetermined number of openings to dictate the cell's specific design parameters. The prior art separator barrier is made of polyethylene or polypropylene materials and is described as being useful in a wide variety of cell chemistries including lithium-oxyhalide cells having a carbonaceous cathode current collector.

The problem with using polyolefines as separators, and particularly as film separators, is that polyolefinic films possess relatively low mechanical strength and are prone to tearing and puncture, especially during cell swelling. This can defeat the intended purpose of providing the cell with a self-limiting structure in the first place. A perforated separator that ruptures during cell discharge can, at the very least, cause an inaccuracy in the cell's intended discharge performance and, at the worst, cause an internal short circuit condition that may render the cell inoperative and possibly create an explosive venting condition.

Therefore, there exists a need for an electrochemical cell having a discharge modifying structure that is capable of withstanding mechanical stresses such as those caused by electrode swelling, elevated temperatures and shock and vibration forces of the kind experienced in well drilling operations, and the like without the modifying structure rupturing or otherwise becoming structurally compromised.

SUMMARY OF THE INVENTION

The electrochemical surface area of a cell is strongly associated with the cell's performance and safety. Several geometric arrangements of anode and cathode electrodes have been utilized to provide an electrode surface area appropriate to a cell's performance and safety requirements. They include spirally-wound (high surface area), double anode or prismatic (intermediate surface area), and bobbin (low surface area). While each of these construction configurations is successful in providing the respective cells with the desired surface area, the techniques and equipment used in the manufacture of the cells are very different. For example, a manufacturer producing both a high discharge rate cell (high surface area, spirally-wound electrodes) and a low rate cell (low surface area, bobbin style construction) would need to support two separate production lines.

It is, therefore, an object of the present invention to provide a structure for modifying the effective electrochemical surface area of a cell, even in chemistries that are known to experience swelling during discharge. This allows the production of cells with variable surface areas while using a single manufacturing line. The method of construction remains unchanged, and the electrochemical surface area is dictated by the use of a single component, i.e., the discharge modifying structure of the present invention.

The discharge modifying structure of the present invention is provided by a mechanically perforated fabric that without the provision of the perforations is substantially impervious or impermeable to ion flow therethrough. The fabric employed in the present invention is an essentially two dimensional sheet. Included within the definition of fabric and sheets as used herein are cloth-like and "paper"-like pliable materials made usually by weaving, felting or knitting synthetic fibers and filaments. Typical fabrics are from about 0.25 to about 20 mils thick. Thicker or thinner materials may be used, if desired. Preferably the fabric is from about 0.5 mils to about 5 mils thick and is of a thermoplastic roll stock.

According to the present invention, a layer of perforated fabric is placed between the anode and cathode along with a suitably absorbent separator material. The electrodes are then assembled into a cell using typical techniques, with the spirally-wound configuration being preferred. The perforated fabric must be thin, and both mechanically and chemically stable within the cell environment. The perforation size and pattern is used to determine the effective surface area of the cell. The perforated fabric, in practice, masks the electrodes allowing the discharge reaction to take place only in limited areas determined by the perforation pattern. The attenuating effect of this invention is most apparent under high rate discharge or short circuit conditions. Under low discharge rate conditions the use of the perforated fabric does not appreciably diminish overall cell capacity.

Thus, it will be appreciated that the primary function of the fabric of the present invention is to provide a discharge modifying structure that in an imperforate state substantially precludes or prevents anode ion flow therethrough. It is only through the provision of perforations that the ion-impermeable fabric provides for ion migration from the anode to the cathode, and then, only through the open area provided by the perforations. In that regard, the fabric of the present invention is referred throughout the specification as an ion-impermeable perforated fabric or discharge modifying structure. Unexpectedly, it has been determined that the perforated fabric of the present invention also provides the cell with an enhanced ability to prevent internal electrical short circuit conditions, even after prolonged exposure to high shock and vibration conditions such as are experienced down hole during a well drilling operation and the like.

The foregoing and additional advantages and characterizing features of the present invention will become clearly apparent upon a reading of the following detailed description together with the included drawings.

DETAILED DESCRIPTION OF THE INVENTION

Figures 1, 2, 3:
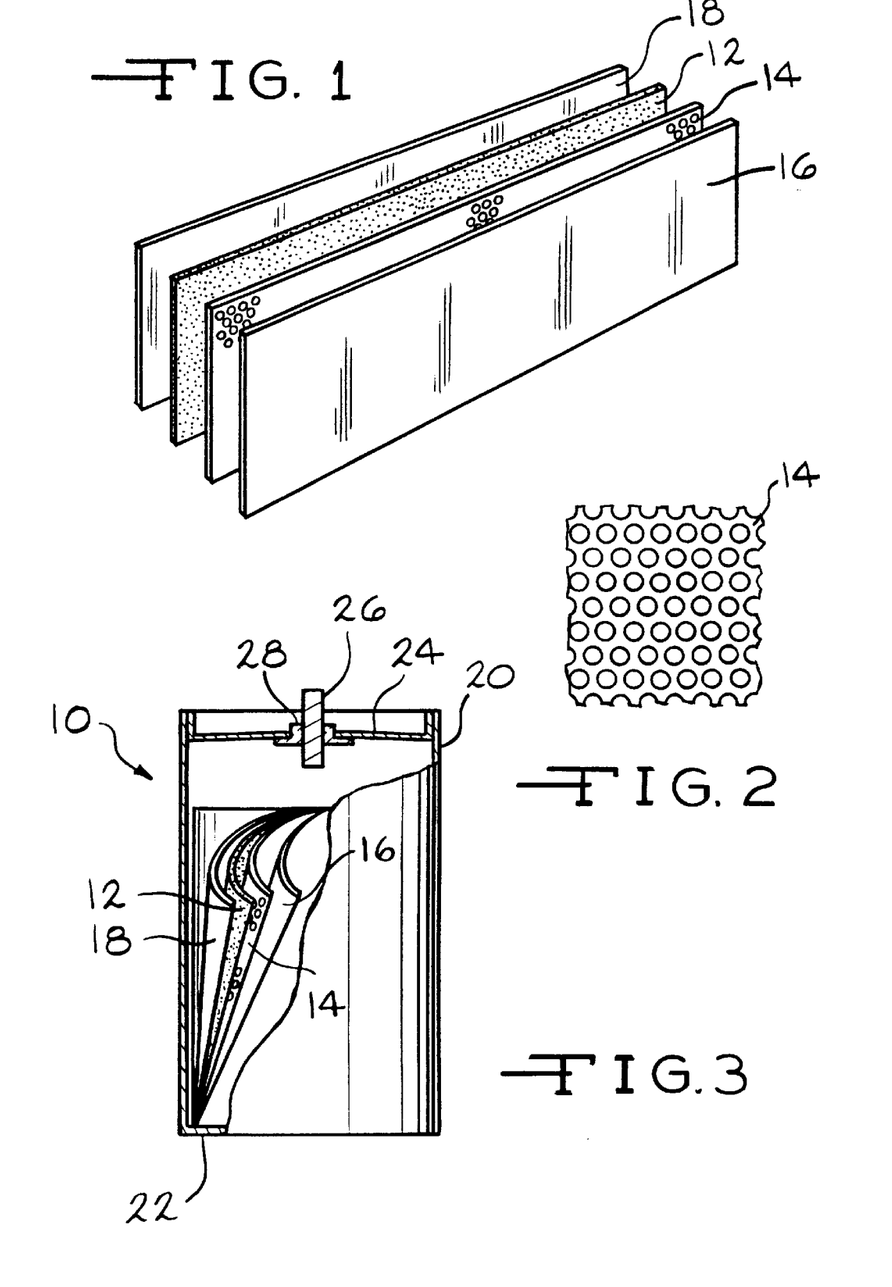
FIG. 1 is a perspective, exploded view of a separator 12 and a perforated, ion-impermeable fabric 14 disposed between an anode 16 and a cathode 18 according to the present invention.
FIG. 2 is a plan view of a portion of the perforated ion-impermeable fabric 14 according to the present invention.
FIG. 3 is a view, partly in section and partly exploded, of a spirally-wound electrochemical cell 10 according to the present invention.

Referring now to the drawings, an exemplary electrochemical cell 10 is shown according to the present invention constructed having a separator 12 superposed with a discharge modifying structure in the form of an ion-impermeable perforated fabric 14 to provide separation between an anode electrode 16 and a cathode electrode 18. For reasons that will be explained in detail hereinafter, the separator 12 preferably faces the cathode 18 and the fabric 14 preferably faces the anode 16. The separator 12 and superposed ion-impermeable perforated fabric 14 are thus placed between the anode 16 and the cathode 18 of the cell 10 in a manner preventing physical contact between the electrodes. While the anode 16 and the cathode 18 are shown in FIG. 3 as a spirally-wound electrode assembly in a jellyroll configuration, that is by way of example only. It will be readily apparent to those skilled in the art that the separator 12 superposed with the ion-impermeable perforated fabric 14 is readily adaptable to various other electrode configurations including prismatic, button shape, and the like without departing from the spirit and scope of the present invention.

The jellyroll configuration is particularly useful for delivering high current and energy while exhibiting increased safety, and is housed in a hollow, cylindrical casing 20. Casing 20 is closed at a lower end by a bottom wall 22, and after the internal components have been assembled therein, is sealed at its upper end by a lid or header 24 welded or otherwise secured in place in a known manner. Casing 20 is formed of a conductive material and, as such, provides one terminal or contact for making electrical connection between the cell 10 and its load. Header 24 is also of a conductive material, preferably the same material as casing 20. The other electrical terminal or contact for the cell 10 is provided by a conductor or pin 26 extending from within the cell and through the casing 20, particularly through the header 24. Conductor 26 is electrically insulated from the conductive header 24 by a glass-to-metal seal 28. The glass used is a corrosion resistant type, for example, having from about 0% to about 50% by weight silicon such as CABAL 12, TA 23, CORNING 9013, FUSITE 425 or FUSITE 435. The conductor preferably comprises titanium although molybdenum and aluminum, such as an aluminum 52 alloy pin, can also be used. A hermetically sealed electrolyte fill opening (not shown) is also provided in the lid 24.

Anode active materials acceptable for use with the present separator 12 and superposed ion-impermeable perforated fabric 14 comprise metals selected from Groups IA, IIA and IIIA of the Periodic Table of the Elements, including lithium, sodium, potassium, calcium, magnesium or their alloys, or any alkali metal or alkali-earth metal capable of functioning as an anode. Alloys and intermetallic compounds include, for example, Li-Si, Li-Al, Li-Mg, Li-Al-Mg, Li-B and Li-Si-B alloys and intermetallic compounds. In that case, the anode active material preferably comprises lithium. The form of the anode may vary, but typically, the anode comprises a thin sheet or foil of the anode metal, and a current collector (not shown) contacted to the anode material. The current collector includes an extended tab or lead (not shown) for connection to the negative terminal.

The cathode electrode 18 of the exemplary electrochemical cell 10 has a current collector (not shown) including a lead for connection to the positive cell terminal 26. The conductor portion of the cathode current collector is in the form of a thin sheet of metal screen, for example, a titanium, stainless steel, aluminum or nickel screen having the lead extending therefrom.

The cathode electrode 18 comprises solid active materials such as are typically used in alkali metal/solid cathode electrochemical cells. Suitable electrode active materials include a metal, a metal oxide, a metal sulfide, fluorinated carbon and carbonaceous materials, and mixtures thereof. Examples of electrode active materials that may be formed into a cathode component include, but are not limited to, manganese dioxide, copper silver vanadium oxide, silver vanadium oxide, copper vanadium oxide, titanium disulfide, copper oxide, copper sulfide, iron sulfide, iron disulfide, carbon and fluorinated carbon, and mixtures thereof. Preferably, the cathode comprises about 80 to about 99 weight percent of the electrode active material.

The separator 12 and superposed ion-impermeable perforated fabric 14 of the present invention are particularly useful with active materials prepared from fluorine and carbon including graphitic and nongraphitic forms of carbon, such as coke, charcoal or activated carbon. Fluorinated carbon cathode active materials are known to swell up to 150% of their original thickness during discharge. Such swelling can lead to tearing, rupture and otherwise structural compromise in the conventional polyolefinic film separator barriers. It is, therefore, an important aspect of the present invention that the ion-impermeable perforated fabric 14 providing the discharge modifying structure is capable of withstanding the magnitude of swelling typically experienced in a fluorinated carbon cell without experiencing structural compromise.

Fluorinated carbon is represented by the formula $(CF_x)_n$ wherein x varies between about 0.1 to 1.9 and preferably between about 0.5 and 1.2, and $(C_2F)_n$ wherein the n refers to the number of monomer units which can vary widely. The preferred cathode active mixture comprises $CF_x$ combined with a discharge promoter component such as acetylene black, carbon black and/or graphite. Metallic powders such as nickel, aluminum, titanium and stainless steel in powder form are also useful as conductive diluents when mixed with the cathode active mixture of the present invention. Up to about 10 weight percent of the conductive diluent is added to the mixture to improve conductivity.

Solid cathode active components for incorporation into a cell according to the present invention may be prepared by rolling, spreading or pressing a mixture of one or more of the above listed electrode active materials, a discharge promoter component and/or one or more of the enumerated conductive diluents onto the cathode current collector with the aid of a binder material. Preferred binder materials include a fluoropolymer such as an aqueous emulsion of polytetrafluoroethylene (PTFE) commercially available from DuPont under the designation T-30. Polyvinylidene fluoride is also a useful binder material. Preferably the binder material is present at about 1 to about 5 weight percent of the electrode active material. Cathodes prepared as described above may be in the form of a strip wound with a corresponding strip of anode material in a structure similar to a "jellyroll", as shown in FIG. 3, or in the form of one or more plates operatively associated with at least one or more plates of anode material.

The exemplary cell 10 further includes the separator 12 and the superposed ion-impermeable perforated fabric 14 of the present invention disposed intermediate the Group IA anode 16 and the cathode 18 to provide physical separation therebetween. The separator 12 is of electrically insulative material and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the electrochemical cell. Illustrative separator materials include woven and non-woven fabrics of polyolefinic fibers including polyvinylidine fluoride, polyethylenetetrafluoroethylene, and polyethylenechlorotrifluoroethylene laminated or superposed with a polyolefinic or fluoropolymeric microporous film, nonwoven glass, glass fiber materials and ceramic materials. Suitable microporous films include a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

Figure 1A:
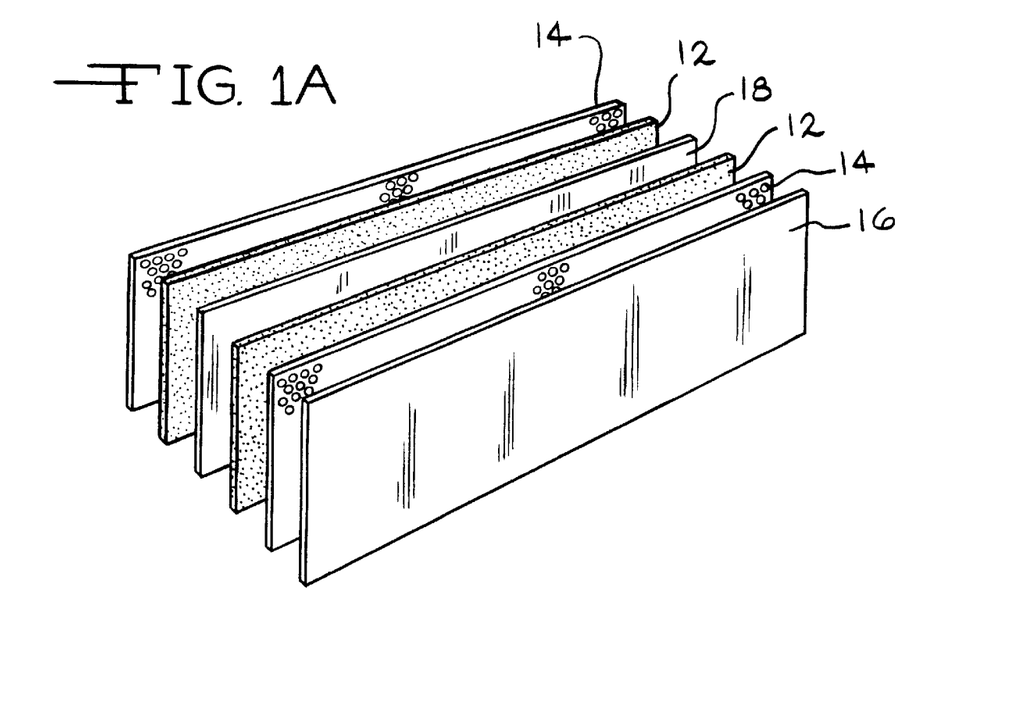
FIG. 1A is a perspective, exploded view of the separator 12/fabric 14 combination provided as two superposed structures, one positioned on either side of the cathode 18.

To prevent movement of the separator 12 with respect to the ion-impermeable perforated fabric 14 during cell fabrication, the separator 12/fabric 14 combination is provided as two superposed structures, one positioned on either side of one of the electrodes such as the cathode (FIG. 1A). The opposed superposed separator 12/fabric 14 structures are then heat sealed to each other at their peripheries to envelope the enclosed electrode.

The ion-impermeable perforated fabric 14 is of a material having mechanical characteristics including tensile strength and percent elongation that compensate for cathode swelling during discharge without the need for increased amounts of fabric material. The fabric material in its unperforated state acts as an ion-impermeable structure that substantially prevents flow of alkali metal ions therethrough. By way of example, the ion-impermeable fabric material can be a woven fiberglass cloth impregnated with synthetic resinous fluorine-containing polymers. In particular, a preferred form of the ion-impermeable perforated fabric 14 is a fibrous glass cloth coated with about 20% to 70%, by weight, polytetrafluoroethylene (PTFE). Optionally, the fiberglass cloth can be further coated with up to about 5%, by weight, dimethyldiphenylpolysiloxane. The preferred fabric 14 is commercially available from Furon, Hoosick Falls, N.Y. under the designation Fluorpeel.

In its as received, unperforated state, this material is substantially impervious or impermeable to metal ion flow therethrough. As particularly shown in FIG. 2, prior to incorporation into the exemplary electrochemical cell, the ion-impermeable fabric is mechanically perforated with a pattern of openings 30, each opening having a desired shape and juxtaposition to provide a perforated pattern having an open area of about 20% to 70% of the total surface area of the fabric to thereby provide for ion flow therethrough. It should be understood that while the openings 30 are shown having a circular shape, that is not necessary to practice the present invention. Other shapes such as square, rectangular, elliptical and the like may be used as desired.

The electrochemical cell 10 of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic or organic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent or, a single solvent. The ionically conductive salt serves as the vehicle for migration of the anode ions to intercalate or react with the cathode active material. In a solid cathode/electrolyte system, the preferred ion-forming alkali metal salt is similar to the alkali metal comprising the anode. Examples of salts useful with the present invention include $LiPF_6$, $LiAsF_6$, $LiSbF_6$, $LiBF_4$, $LiAlCl_4$, $LiO_2$, $LiGaCl_4$, $LiSO_3F$, $LiB(C_6H_5)_4$, $LiClO_4$, $LiC(SO_2CF_3)_3$, $LiN(SO_2CF_3)_2$ and $LiCF_3SO_3$, and mixtures thereof.

Low viscosity solvents include tetrahydrofuran (THF), methyl acetate (MA), diglyme, trigylme, tetragylme, dimethyl carbonate (DMC), 1,2-dimethoxyethane (DME), diethyl carbonate and mixtures thereof, and high permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-butyrolactone (GBL) and N-methyl-pyrrolidinone (NMP) and mixtures thereof. In the preferred electrochemical cell comprising the $Li/CF_x$ couple, the preferred electrolyte is 1.0M to 1.4M $LiBF_4$ in y-butyrolactone (GBL).

The separator 12 and the superposed ion-impermeable perforated fabric 14 of the present invention are also useful in an alkali metal ion cell. Such rechargeable cells are typically constructed in a discharged state. The alkali metal ion, such as lithium, comprising a lithiated cathode is then intercalated into a carbonaceous anode by applying an externally generated electrical potential to recharge the cell. The applied recharging electrical potential serves to draw the alkali metal ions from the cathode, through the combination separator via the electrolyte and into the carbonaceous material of the anode to saturate the same. The cell is then provided with an electrical potential and is discharged in a usual manner. Particularly useful lithiated materials that are stable in air and readily handled include lithiated nickel oxide, lithiated manganese oxide, lithiated cobalt oxide and lithiated mixed oxides of cobalt with nickel or tin. The more preferred oxides include $LiNiO_2$, $LiMnO_4$, $LiCoO_2$, $LiCo_{0.92}Sn_{0.08}O_2$ and $LiCo_{1-x}Ni_xO_2$.

The separator 12 and the superposed ion-impermeable perforated fabric 14 of the present invention are further useful in a cell having an alkali metal anode coupled with a catholyte/depolarizer such as sulfur dioxide or oxyhalides including phosphorized chloride, thionyl chloride and sulfuryl chloride, used individually or in combination with each other or in combination with halogens and interhalogens, such as bromine trifluoride, or other electrochemical promoters or stabilizers. In combination with an alkali metal anode, suitable catholytes include thionyl chloride, sulfuryl chloride, chlorinated sulfuryl chloride (CSC), thionyl chloride-bromine chloride (BCX), and mixtures thereof having an alkali metal salt dissolved therein. For example, the Li/CSC system includes a suitable electrolyte salt prepared in-situ in sulfuryl chloride with gaseous chlorine added. In such systems, the cathode is comprised of a high surface area carbonaceous admixture formed from a mixture of carbon black/PTFE materials. The carbonaceous admixture including the binder and conductive diluent is formed into a free-standing sheet in a manner similar to that described in U.S. Pat. No. 5,543,249 to Takeuchi et al., which is assigned to the assignee of the present invention and incorporated herein by reference.

The preferred form of the exemplary electrochemical cell 10 is a case-negative design wherein the anode/cathode couple is inserted into the conductive metal casing 20 such that the casing or the header 24, or both are connected to the anode current collector and serve as the negative cell terminal, as is well known to those skilled in the art. A preferred material for the casing 20 is stainless steel although titanium, nickel and aluminum are also suitable. The casing header comprises the metallic lid 24 having a sufficient number of openings to accommodate the glass-to-metal seal 28/terminal pin 26 feedthrough for the cathode electrode 18. An additional opening is provided for electrolyte filling. After the spirally-wound electrode assembly is inserted into the casing 20 and the casing header 24 is secured thereto, the cell 10 is filled with the electrolyte solution described hereinabove and hermetically sealed such as by close-welding a stainless steel plug over the fill hole, but not limited thereto. The cell 10 of the present invention can also be constructed in a case-positive design.

The preferred chemistry for the exemplary cell 10 is the Li/CF$_x$ couple. During discharge, the fluorinated carbon cathode is known to swell up to 150% of its original, undischarged thickness. Such swelling can exert substantial stress forces on a conventional separator, such as a polyolefinic separator. However, the ion-impermeable perforated fabric 14 of the present invention consisting of the preferred Fluorpeel material is capable of withstanding such forces without rupture or structural compromise which is an unexpected benefit of the present invention. In that light, the present cell 10 is constructed having the woven or non-woven separator 12 facing the cathode 18 and the ion-impermeable perforated film 14 facing the anode 16. This configuration is believed to provide an electrolyte rich environment proximate the cathode 18 which benefits improved depth of discharge in the cathode and provides the cell with enhanced discharge characteristics. The cell of the present invention is particularly adapted for discharge under a light load for extended periods of time such as for routine monitoring of cardiac functions by an implantable cardiac defibrillator, measurement while drilling operations, and the like. As is well known to those skilled in the art, the exemplary electrochemical system of the present invention can also be constructed in a case-positive configuration.

The following examples describe the manner and process of manufacturing an electrochemical cell according to the present invention, and they set forth the best mode contemplated by the inventor of carrying out the invention, but they are not to be construed as limiting.

EXAMPLE I

Lithium/CSC (liquid cathode) cells in a C size were constructed in both a standard, spirally-wound configuration having a non-woven glass fiber separator provided between the electrodes, and with a perforated Fluorpeel fabric added to the existing non-woven glass fiber separator. The 0.003" thick Fluorpeel fabric was perforated with 0.125" holes in a regular pattern producing an open area of 41%. Three cells from each group were short circuited in an unfused condition and the peak currents were measured. The results are shown in Table 1.

TABLE 1

| Cell Type | Peak Current (Amps) |
| --- | --- |
| Standard | 33.1 |
| Standard | 36.9 |
| Standard | 32.3 |
| Perf. fabric added | 20.7 |
| Perf. fabric added | 18.2 |
| Perf. fabric added | 20.8 |

Use of the perforated fabric of the present invention reduced the peak short circuit current in the alkali metal/oxyhalide cells by an average of 41.6% in comparison to the cells built in the standard configuration.

Figure 4:
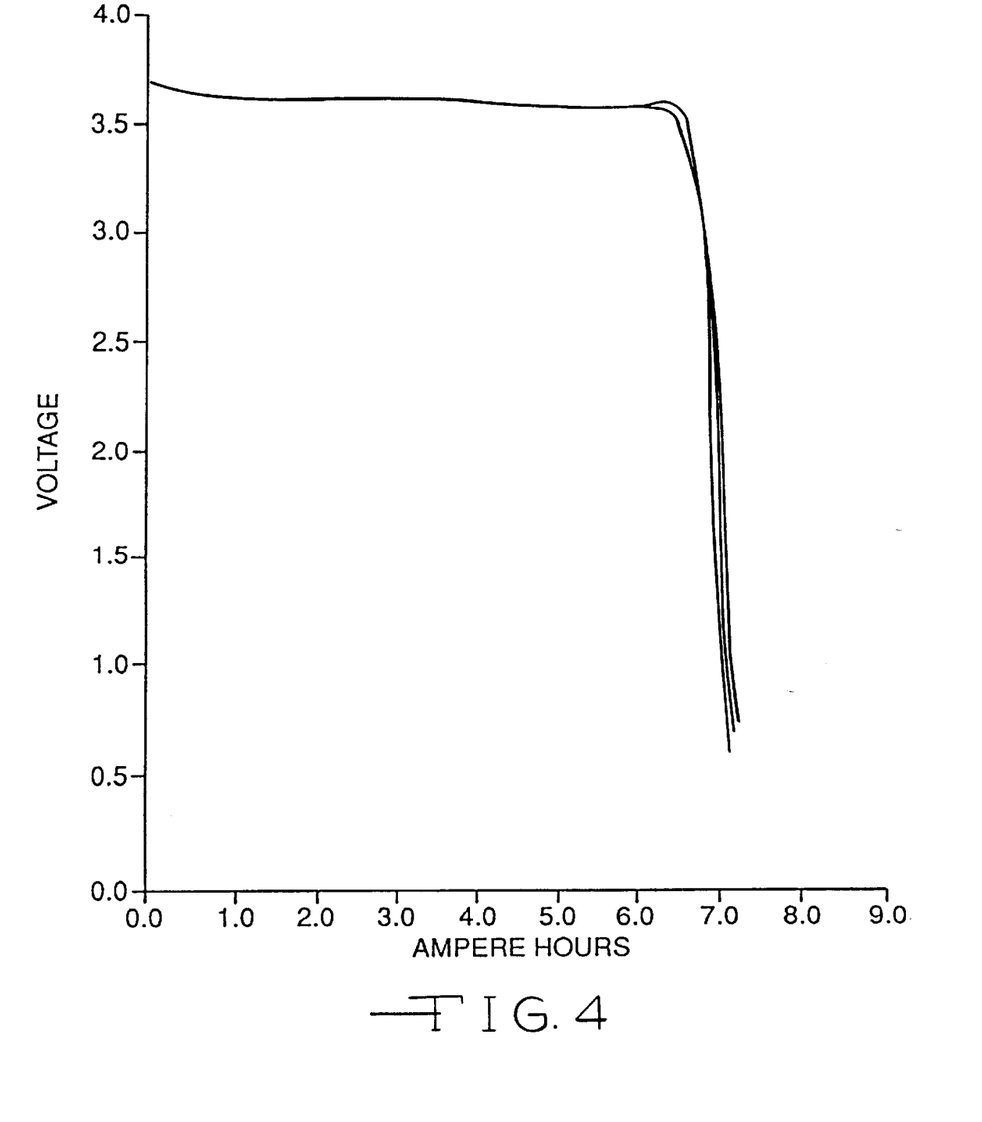
FIGS. 4 and 5 are graphs constructed from the discharge of Li/CSC cells built according to the prior art and the present invention, respectively.
Figure 5:
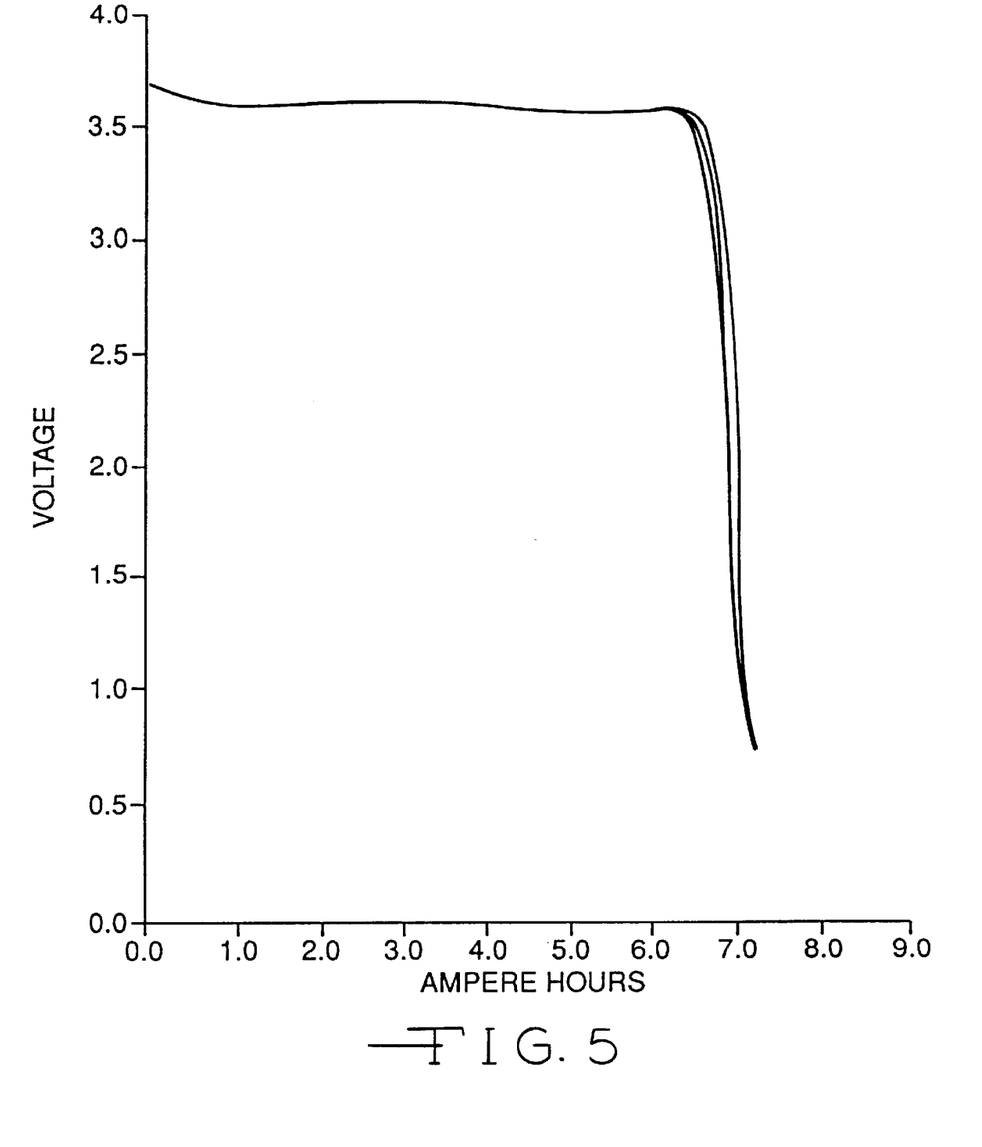

FIGS. 4 and 5 are graphs showing plots of three representative Li/CSC cells from each group discharged at room temperature under a 56 ohm load. Particularly, FIG. 4 shows the discharge curves of three Li/CSC cells constructed in the standard configuration with the non-woven glass fiber separator only, and FIG. 5 shows the discharge curves of three cells of a similar chemistry constructed with the Fluorpeel fabric added to the non-woven glass fiber separator according to the present invention. The discharge capacity of the cells provided with the perforated, non-ion permeable fabric of the present invention was nearly identical to that achieved by the control group having the non-woven glass fiber separator only.

EXAMPLE II

Lithium/carbon monofluoride (solid cathode) cells in a C size were constructed in both a standard, spirally-wound configuration having a non-woven glass fiber separator provided between the electrodes, and with a perforated Fluorpeel fabric added to the existing non-woven glass fiber separator. The 0.003" thick Fluorpeel fabric was perforated with 0.125" holes in a regular pattern producing an open area of 41%. The standard, prior art cell and the present invention Li/CF$_x$ cell with the Fluropeel fabric are available from Wilson Greatbatch Ltd., Clarence, N.Y. under model nos. 3B3300 and 3B4300, respectively. Three cells from the standard group and four cells from the perforated fabric group were short circuited in an unfused condition and the peak currents were measured. The results are shown in Table 2.

TABLE 2

| Cell Type | Peak Current (Amps) |
| --- | --- |
| Standard | 8.3 |
| Standard | 8.7 |
| Standard | 8.6 |
| Perf. fabric added | 6.2 |
| Perf. fabric added | 6.7 |

TABLE 2-continued

| Cell Type | Peak Current (Amps) |
|---|---|
| Perf. fabric added | 6.0 |
| Perf. fabric added | 6.8 |

Use of the perforated fabric of the present invention reduced the peak short circuit current in the model no. 344300 Li/CF$_x$ cells by an average of 24.7% in comparison to the model no. 3B3300 cells built in the standard configuration. This is an important advantage of the present Li/CF$_x$ cells because since they contain less than 5 grams of lithium, the cells meet the applicable requirements for the designated Series T tests as specified in Section 38.3 of the U.N. Transportation of Dangerous Goods Manual of Tests and Criteria. Thus, the use of the perforated fabric of the present invention enables the model no. 3B4300 Li/CF$_x$ cells manufactured by Wilson Greatbatch Ltd. to be shipped as non-hazardous material. The prior art model no. 3B3300 Li/CF$_x$ cells are requested to be shipped as hazardous materials due to the results of short circuit testing. The previously discussed Rosansky cell having a liquid cathode and greater than 0.5 grams of lithium also must be shipped as hazardous material.

Figure 6:
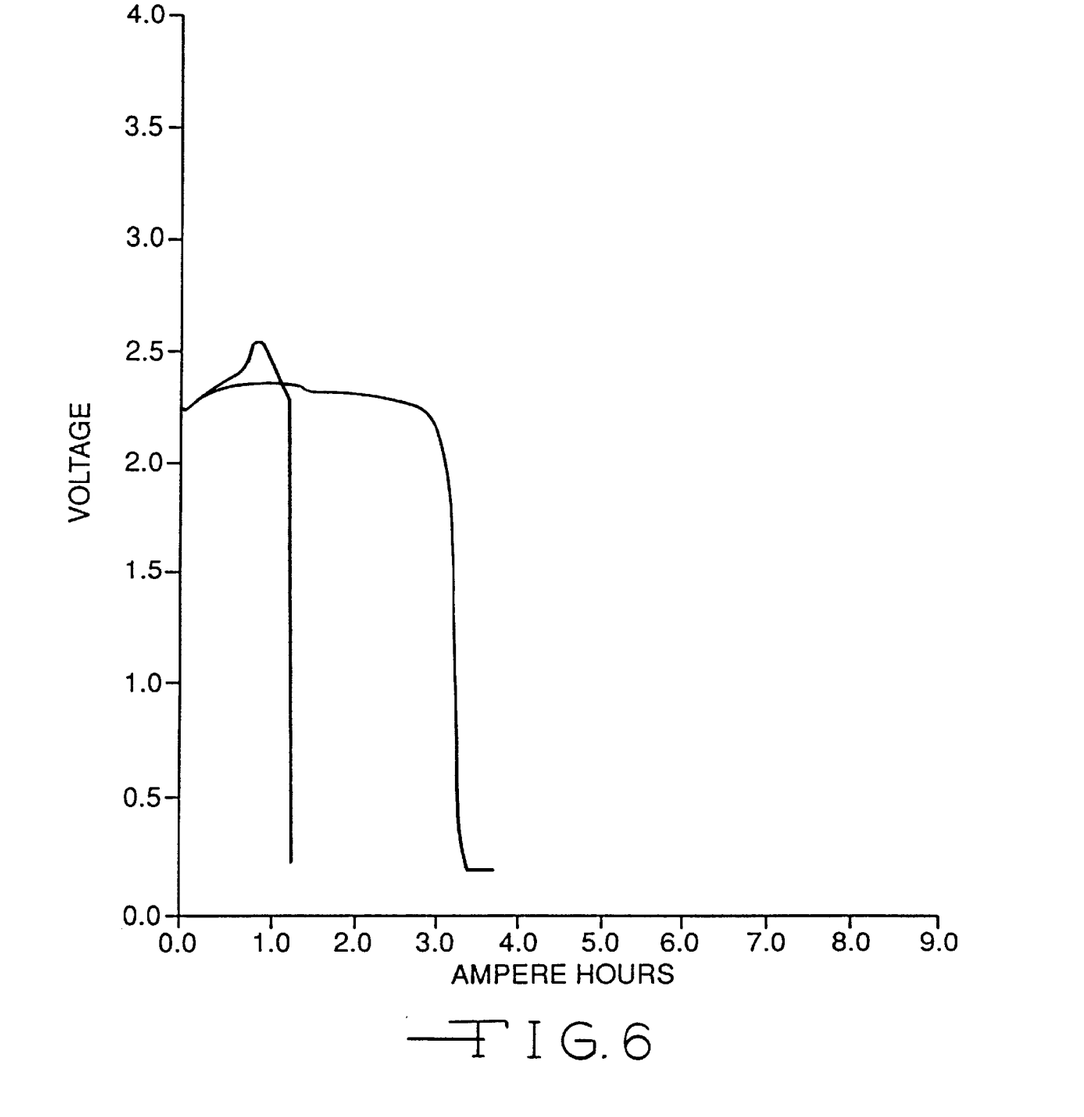
FIGS. 6 and 7 are graphs constructed from the discharge of Li/CF$_x$ cells built according to the prior art and the present inventions, respectively.
Figure 7:
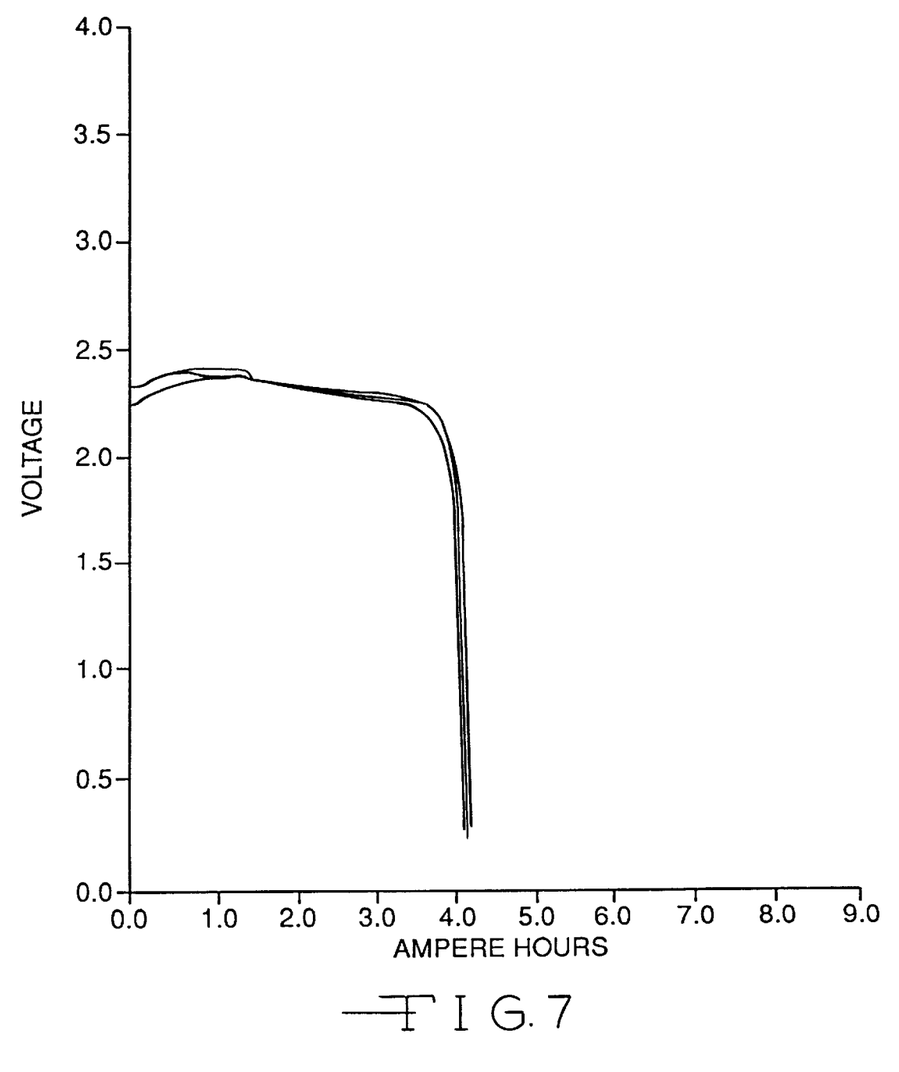

FIGS. 6 and 7 are graphs illustrating the performance of Li/CF$_x$ cells constructed according to the prior art (standard) and the present invention discharged at 177° C. under a 3 ohm load. The cells utilizing the perforated, non-ion permeable fabric according to the present invention reached a capacity of 3.9 Ahrs. to a 2 volt cutoff as shown in FIG. 7. Of the two prior art cells constructed without the fabric (FIG. 6), one cell reached a 3.1 Ahr. level while the other cell failed due to a vent.

EXAMPLE III

In order to demonstrate the improvement in structural integrity afforded by the Fluorpeel fabric of the present invention in comparison to the polyolefinic film materials such as of the type described by Rosansky, tensile strength tests of various materials were performed on an Instron model 1130 tensile test machine. In particular, one inch width samples of 1 mil polypropylene film (Celgard 2500), 0.9 mil polyethylene film (K881) according to the prior art and 3 mil Fluorpeel fabric according to the present invention were tensile strength tested at a crosshead speed of 1 inch/min. The gauge length was 4 inches. The results are shown in Table 3.

TABLE 3

| Material type | Tensile strength (lbs) |
|---|---|
| 1 mil polypropylene film (Celgard 2500) | 13.3 |
| 0.9 mil polyethylene (K881) | 14.5 |
| 3 mil Fluorpeel fabric | 45.8 |

EXAMPLE IV

Li/CF$_x$ cells constructed according to the present invention having a non-woven glass fiber separator superposed with perforated Fluorpeel fabric, as described in Example II, were preconditioned at 37° C. by discharge under a 1.5 kohm load for 18 hours. After a one week open circuit storage at 37° C., a 20 mA acceptance pulse train composed of four pulses, each of a ten second duration immediately followed by a fifteen second rest period, was applied to each cell. The cells were then discharged under either a 1 kohm (Table 4), 2 kohm (Table 5), or a 5 kohm load (Table 6) to a 2 V cut-off. Beginning-of-life (BOL) and end-of-life (EOL) cathode thickness, and the percentage increase are listed in the respective tables.

TABLE 4

| SM | Cathode Material | BOL Cathode Thickness, In. | EOL Cathode Thickness, In. | % Increase |
|---|---|---|---|---|
| 85432 | CF$_x$ | 0.088 | 0.204 | 132 |
| 85438 | | 0.090 | 0.194 | 116 |
| 85445 | | 0.095 | 0.1725 | 82 |
| 85449 | | 0.096 | 0.1755 | 83 |
| 85459 | | 0.093 | 0.176 | 89 |
| Avg. | | | | 100.4 |

TABLE 5

| SM | Cathode Material | BOL Cathode Thickness, In. | EOL Cathode Thickness, In. | % Increase |
|---|---|---|---|---|
| 85430 | CF$_x$ | 0.090 | 0.192 | 113 |
| 85437 | | 0.087 | 0.185 | 113 |
| 85433 | | 0.089 | 0.185 | 108 |
| 85455 | | 0.094 | 0.165 | 76 |
| 85451 | | 0.094 | 0.167 | 78 |
| 85444 | | 0.097 | 0.167 | 72 |
| Avg. | | | | 93.3 |

TABLE 6

| SM | Cathode Material | BOL Cathode Thickness, In. | EOL Cathode Thickness, In. | % Increase |
|---|---|---|---|---|
| 85419 | CF$_x$ | 0.101 | 0.152 | 50 |
| 85423 | | 0.102 | 0.171 | 68 |
| 85428 | | 0.085 | 0.172 | 102 |
| 85435 | | 0.088 | 0.165 | 88 |
| 85441 | | 0.090 | 0.160 | 78 |
| 85443 | | 0.095 | 0.150 | 57.9 |
| 85454 | | 0.096 | 0.155 | 61.5 |
| 85458 | | 0.093 | 0.152 | 63.4 |
| Avg. | | | | 71.1 |

COMPARISON EXAMPLE I

Li/CSC cells constructed according to Example I having carbon cathodes and discharged under a similar regime as the Li/CF$_x$ cells built in Example IV were destructive analyzed for cathode swelling. It was determined that the cathodes in the oxyhalide cells swelled on average about 0% to 5%. The Li/CSC couple is similar to the Li/SO$_2$ cells of the previously referenced U.S. Pat. No. 4,743,520 to Rosansky in the sense that both chemistries contain carbon cathodes and, therefore, are useful as comparisons to the Li/CF$_x$ chemistry.

It is appreciated that various modifications to the inventive concepts described herein may be apparent to those skilled in the art without departing from the spirit and the scope of the present invention as defined by the hereinafter appended claims.

What is claimed is:

1. A method of providing an electrochemical cell, comprising the steps of:
   a) providing an anode;
   b) providing a cathode operatively associated with and proximate to the anode so that during electrochemical reactions of the cell, ions migrate between and to the anode and the cathode;

c) positioning a separator between the anode and the cathode operatively associated with each other, the separator preventing internal electrical short circuit conditions while providing for ion flow between and to the anode and the cathode, through the separator;

d) providing a continuous fabric of a substantially ion impermeable material having a pattern of perforations therethrough, wherein each perforation is of a desired shape and wherein the continuous fabric is of a woven fiberglass cloth impregnated with at least one synthetic resinous fluorine-containing polymer;

e) superposing the continuous fabric with at least a portion of the separator to provide for ion flow through the perforations of the fabric in a controlled amount dictated by the percentage of open area provided by the perforations; and f) activating the operatively associated anode and the cathode with an electrolyte.

2. The method of claim 1 including providing the separator adjacent to the cathode and the perforated fabric adjacent to the anode.

3. The method of claim 1 including providing the anode of an alkali metal.

4. The method of claim 1 including providing the cathode of a carbonaceous material.

5. The method of claim 1 including impregnating the fiberglass cloth with polytetrafluoroethylene.

6. The method of claim 5 including further impregnating the fiberglass cloth with dimethyldiphenylpolysiloxane.

7. The method of claim 1 wherein the anode and the cathode are operatively associated with each other in a spirally-wound configuration.

8. The method of claim 1 wherein the cathode comprises a liquid selected from the group consisting of sulfur dioxide and/or an oxyhalide including phosphoryl chloride, thionyl chloride and sulfuryl chloride used individually or in combination with each other or in combination with halogens, interhalogens or other electrochemical promoters or stabilizers.

9. The method of claim 1 wherein the perforations provide the fabric with an open area of about 1% to about 75%.

10. The method of claim 1 including mechanically perforating the fabric after the fabric has been woven.

11. The method of claim 1 including providing two superposed structures comprising the perforated, continuous fabric superposed with the separator and positioning one of the superposed structures on opposed sides of at least one of the anode and the cathode and wherein the superposed separator/perforated, continuous fabric structures are sealed to each other at their peripheries to envelope the one of the anode and the cathode.

12. A method for providing an electrochemical cell, comprising the steps of:

a) providing an anode;

b) providing a cathode;

c) positioning a separator between the anode and the cathode operatively associated with each other, the separator preventing internal electrical short circuit conditions;

d) providing a continuous fabric of a substantially ion impermeable material having a pattern of perforation therethrough, wherein each perforation is of a desired shape and wherein the continuous fabric is of a woven fiberglass cloth impregnated with at least one synthetic resinous flourine-containing polymer;

e) superposing the continuous fabric with at least a portion of the separator to provide for ion flow through the perforations of the fabric in a controlled amount dictated by the percentage of open area provided by the perforations, wherein the separator is adjacent to the cathode and the perforated fabric is adjacent to the anode; and f) activating the operatively associated anode and the cathode with an electrolyte.

* * * * *